United States Patent [19]

Honerkamp et al.

[11] 4,432,779
[45] Feb. 21, 1984

[54] SYSTEM OF GAS DEHYDRATION USING LIQUID DESICCANTS

[75] Inventors: Joseph D. Honerkamp; Harold O. Ebeling, both of Tulsa, Okla.

[73] Assignee: Latoka Engineering, Inc., Tulsa, Okla.

[21] Appl. No.: 472,088

[22] Filed: Mar. 4, 1983

Related U.S. Application Data

[63] Continuation-in-part of Ser. No. 421,568, Sep. 22, 1982, which is a continuation-in-part of Ser. No. 227,798, Jan. 23, 1981, Pat. No. 4,375,977.

[51] Int. Cl.³ .................................. B01D 53/14
[52] U.S. Cl. ....................... 55/233; 55/185; 55/248
[58] Field of Search .................... 55/29–32, 55/48, 89, 90, 95, 185, 208, 221, 223, 227, 233, 234, 248, 255, 256; 261/114 A, 123

[56] References Cited

U.S. PATENT DOCUMENTS

| | | | |
|---|---|---|---|
| 1,913,885 | 6/1933 | Jordahl | 55/234 |
| 3,170,776 | 2/1965 | Knight et al. | 55/221 |
| 3,532,595 | 10/1970 | Arnesjo et al. | 55/223 X |
| 3,881,898 | 5/1975 | Darby et al. | 55/223 |
| 3,959,419 | 5/1976 | Kitterman | 55/233 X |
| 3,960,507 | 6/1976 | Tsujikawa et al. | 55/233 X |
| 4,110,088 | 8/1978 | Cold et al. | 55/233 X |
| 4,157,250 | 6/1979 | Regehr et al. | 55/233 |

FOREIGN PATENT DOCUMENTS

| | | | |
|---|---|---|---|
| 54-17710 | 7/1979 | Japan | 55/234 |
| 956858 | 4/1964 | United Kingdom | 55/233 |

*Primary Examiner*—Robert H. Spitzer
*Attorney, Agent, or Firm*—Head, Johnson & Stevenson

[57] ABSTRACT

An improved method of dehydrating wet gas including the steps of passing the wet gas into a pool of glycol contained within a vessel, the gas passing upwardly through the pool and through at least two zones within the vessel in which the gas is subjected to levels of glycol saturated packing within the zones, the gas passing upwardly within the vessel to a gas collection chamber for removal, the glycol being circulated from zone to zone within the vessel.

5 Claims, 11 Drawing Figures

SYSTEM OF GAS DEHYDRATION USING LIQUID DESICCANTS

CROSS-REFERENCE TO RELATED APPLICATIONS

This is a continuation-in-part of copending application, Ser. No. 421,568, filed Sept. 22, 1982, entitled: "ABSORBER FOR DEHYDRATING GAS" which is a continuation-in-part of my copending application, Ser. No. 227,798, filed Jan. 23, 1981, entitled: "SYSTEM OF GAS DEHYDRATION USING LIQUID DESICCANTS", now U.S. Pat. No. 4,375,977.

BACKGROUND OF THE INVENTION

1. Field of the Invention

This disclosure relates to an improved method and apparatus for practicing the method of extracting water from wet gas to provide, at the outlet, a flow of gas substantially free of water. The invention is particularly applicable to the processing of natural gas in which the gas has entrained in it water of sufficient quantity to make its further transportation and storage difficult and includes improved means of extracting the water from the gas at a point adjacent the area where the gas is collected to provide, at the outlet, gas substantially free of water so that it may be more economically and efficiently transported, stored, processed, and used.

The field of the invention is particularly concerned with a well-known method for extracting water from gas known as "glycol dehydration" or liquid desiccant dehydration" in which the wet gas is mixed and/or contacted with glycol or some other liquid desiccant, the glycol absorbing water from the gas, the glycol then being heated to evaporate the water from it, and the anhydrous glycol being recirculated for adsorption and/or admixture with wet gas, in a continuous process. The invention improves the known techniques of glycol dehydration by providing a method in which the gas is more intimately contacted with the glycol for more improved extraction of water from the gas and includes improved apparatus wherein effective water extraction can be achieved with vessels of reduced height and better economy of construction.

2. Description of the Prior Art

The invention, as above mentioned, is concerned with extracting water from wet gas and is particularly applicable for utilization in the petroleum processing industry wherein natural gas commonly has entrained in it a quantity of water. If the water remains in the gas as it is transported, stored and used, it is a source of many problems. The water entrained in the gas easily freezes and thereby can plug pipelines, valves, orifices, etc. In addition, the water constitutes a non-combustible portion of natural gas as it emanates from production sources, and the handling and transportation of this portion of the naturally occurring gas stream is uneconomical and inefficient. For these and many other reasons, it is highly desirable that as much water as possible be extracted from natural gas after it flows from gas production sources, and the extraction process is preferably carried out in the vicinity of the source where the gas is produced. In this way the gas can be processed to remove excess water before it is conveyed to transmission lines or is further processed.

There are a variety of ways for separating water from gas, but the method most commonly employed in the petroleum industry is the use of glycol or other liquid desiccant dehydrators. Glycol readily mixes with water and has a lower vapor pressure than water. Thus, it is well known to pass wet gas into contact with glycol wherein the water in the gas is absorbed by the glycol. The gas is then passed in an upward column wherein the glycol/water mixture physically separates from the gas stream. The glycol/water mixture is then heated to drive off the water, the dry or anhydrous glycol then being recirculated to contact wet gas in a continuous process so that water is extracted from a gas stream.

A difficulty associated with most glycol dehydrators is that in order to achieve sufficient contact of wet gas and glycol, it has been necessary to construct vessels of relatively tall vertical height. The typical absorber vessel includes a plurality of vertical trays with a series of bubble caps in each tray. Glycol is maintained on each tray at a shallow depth, the gas passing through the bubble caps where it contacts the glycol. A certain minimum spacing is required between the bubble trays in order to allow entrained droplets of glycol carried by the upwardly moving gas stream to fall downwardly. It is apparent that constructing vessels of high vertical height is relatively expensive and, in addition, such construction requires that the vessels be transported to the site in a horizontal position and subsequently erected in place. With the current commonly practiced techniques of glycol dehydration, it is not practical to fabricate a complete gas dehydration system in a factory and transport it for direct installation in the field because of the vertical height requirements.

The present invention provides a means of utilizing glycol gas dehydration in a manner which provides improved effectiveness and efficiency in contacting wet gas with glycol and in a manner which does not require tall vertical vessels having a plurality of bubble trays. The present invention provides improved means of glycol dehydration utilizing shorter height vessels and in an arrangement wherein the percentage of entrained water removed from wet gas is significantly improved.

The present invention, in which this disclosure is a continuation, achieves the results and benefits above described while employing vessels which are more economical of construction and in which improved flow characteristics are achieved.

SUMMARY OF THE INVENTION

A method of dehydrating wet gas is provided including separator and absorber vessels for practicing the invention. The method includes passing wet gas downwardly, into a pool or glycol, the gas being moved upwardly through a bubble cap tray packing system flooded with glycol and into an upper gas collection chamber. In the collection chamber entrained droplets of glycol fall out, leaving in the upper portion of the collection chamber dry gas which is withdrawn from the vessel. The glycol within the vessel having liquid absorbed in it is circulated to a glycol regeneration facility wherein liquid entrained in the glycol is removed, providing anhydrous glycol. The anhydrous glycol is circulated back to the vertical gas stream providing a continuous process by which liquid is removed from the gas stream.

The invention includes the provision of an improved separator formed of an upright vessel having a gas inlet, a gas outlet, and a liquid outlet. Means is provided within the lower end of the vessel for the collection of liquid. Within the vessel any entrained droplets of liquid fall out of the gas as the gas moves upwardly within the vessel, the liquid being withdrawn.

The invention provides an improved absorber for contacting gas having water entrained therein with glycol. The absorber is in the form of an upright vessel including horizontal plates which separate the vessel interior into an upper, an intermediate, and a lower chamber. Each horizontal plate has a plurality of openings, each of which has affixed to it a short length vertical cylindrical member, the lower end of each of the cylindrical members extending below the plate and the upper end extending above the plate. A cap covers the upper portion of each of the cylindrical members, the cap having passageways therein below the upper ends of the cylindrical members. Gas passes upwardly through the cylindrical members and under the caps and out the openings therein. A pool of glycol is maintained in the lower chamber and in the lower portion of the intermediate and upper chambers. Gas passes through the packing into a free area within the upper chamber above the packing wherein entrained droplets of glycol are free to fall out. The dry gas, having the liquid originally entrained in it absorbed by the glycol, passes out the top of the vessel. The glycol is then recirculated through a regenerator. The combination of the improved separator and improved absorber vessels, used in the method of the invention, provides a superior means of extracting water from a gas stream.

DESCRIPTION OF THE PREFERRED EMBODIMENTS

Figure 1:
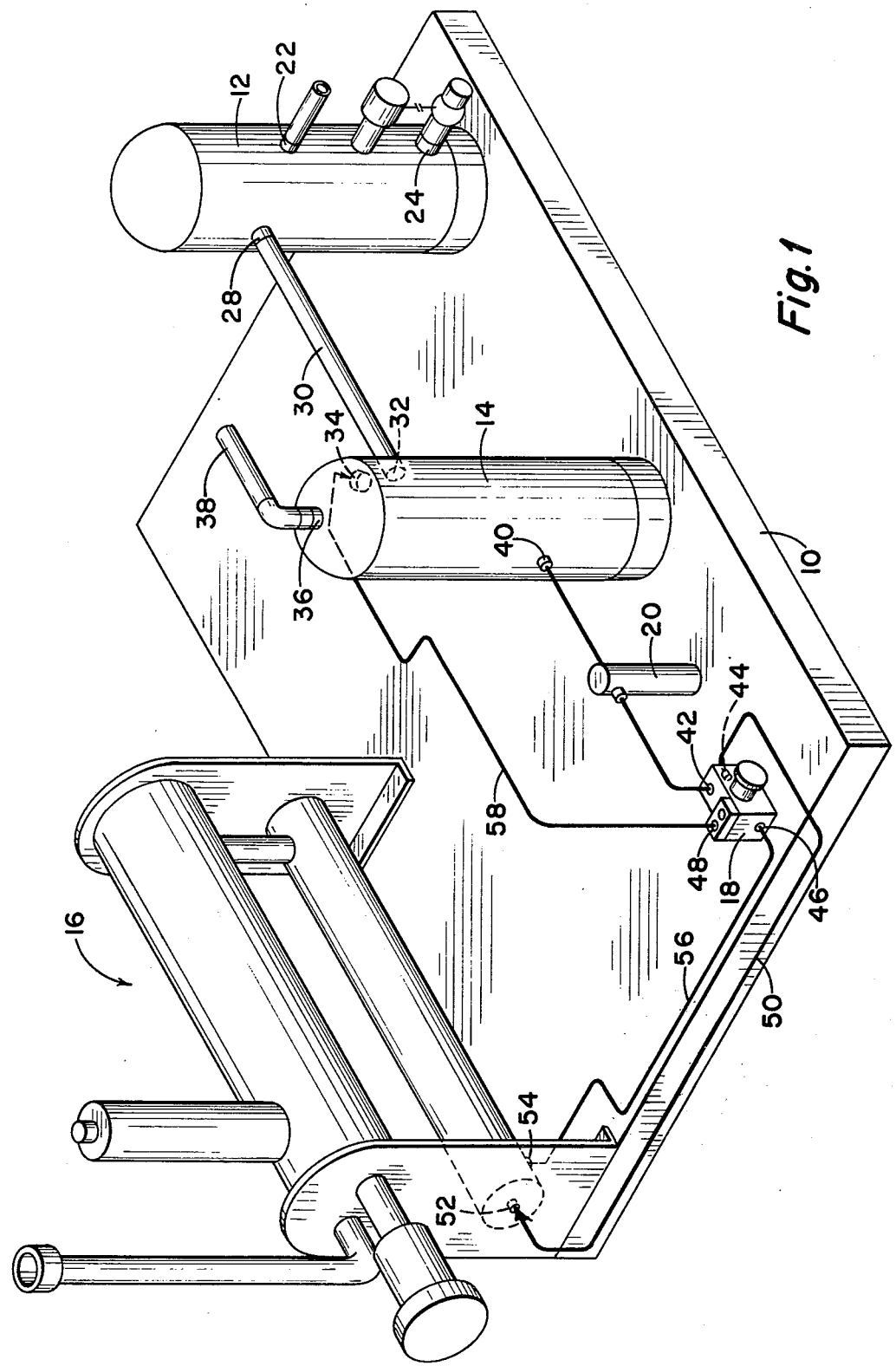
FIG. 1 is an isometric view of a glycol dehydration unit which employs the invention.

Referring now to the drawings and first to FIG. 1, one embodiment which may be employed in practicing the invention is illustrated. The apparatus necessary to implement the method of the invention is shown mounted on a base 10 which, for simplicity purposes, is shown as a solid base although it may be in the form of a fabricated base of metal structural members of the type commonly employed in skid mounting equipment utilized in the petroleum industry. Mounted on the base 10 is a vertical separator vessel 12, a vertical absorber vessel 14, a glycol regenerator generally indicated by the numeral 16, a glycol pump 18, and a glycol filter 20. The gas dehydrator assembly of FIG. 1 is particularly adaptable for mounting in a field or processing plant wherein gas is treated to remove excess liquid therefrom before the gas is conveyed to a pipeline for subsequent transportation, storage or processing.

The gas from a well or wells flows into separator vessel 12 through a gas inlet 22. Within vessel 12, as will be described in greater detail subsequently, the wet gas is handled in such a manner as to allow liquid entrained therein to fall out and to be thereby separated from the gas to the extent possible which can be accomplished physically, that is, by allowing gravity to extract from the flowing gas stream. Liquid is collected in the bottom of vessel 12 and is drawn out through liquid outlet 24. The gas passes out of vessel 12 through gas outlet 28 and by way of pipe 30 to the gas inlet 32 of absorber 14. Glycol is injected into absorber 14 through glycol inlet 34. Within the absorber the gas is thoroughly and completely mixed with glycol, after which the gas is passed upwardly within the vessel (all of which will be described in more detail), with the dry gas passing out through outlet 36. Thus, wet gas is conveyed into the separator vessel 12 at gas inlet 22 and dry gas passes out of the absorber from outlet 36 where it may be conveyed by pipe 38 to a pipeline, process plant, compressor or other facilities wherein the gas is transported, stored, and utilized.

Glycol circulated out of absorber 14 from glycol outlet 40 passes through the filter 22 into the glycol pump 18. The pump 18 has a dual channel pump; that is, it has an inlet 42 and an outlet 44 providing one stream within the pump. In addition, it has another inlet 46 and an outlet 48 providing a second stream within the pump. The glycol streams are not co-mingled within the pump, and it can be seen that other types of pumps and flow splitting arrangements can be used.

The glycol passing from absorber 14 through filter 20 and into pump inlet 42 is moved by the pump through outlet 44 and by way of pipe 50 to the inlet 52 of glycol regenerator 16. Within the regenerator the glycol having water absorbed therein is subjected to heat, normally supplied by natural gas available from the field, or by other energy source, so that the water in the glycol is driven off, producing anhydrous glycol. The details of construction and operation of the glycol regenerator 16 are not part of this invention since such are commonly known and practiced in the petroleum industry. Glycol, having had the liquid removed therefom, passes out of the regenerator outlet 54 as substantially water-free, or anhydrous, glycol. It flows by pipe 56 to the pump inlet 46. The pump moves the glycol stream from outlet 48A by way of pipe 58 to the absorber glycol inlet 34.

Figure 4:
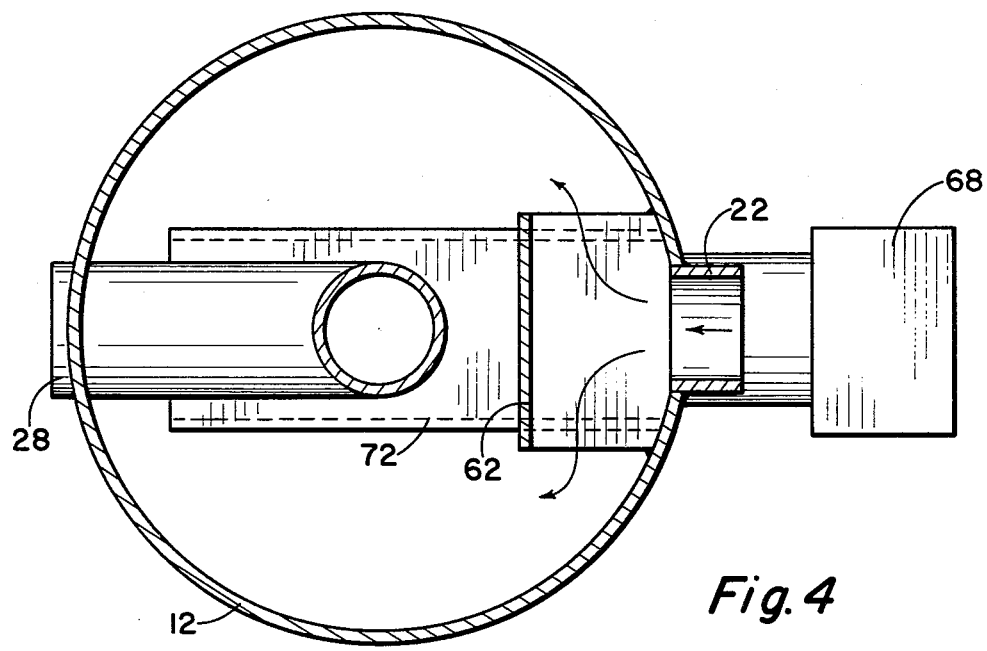
FIG. 4 is a cross-sectional view of the separator vessel taken along the line 4—4 of FIG. 2.

The apparatus for dehydrating gases illustrated in FIG. 1 will typically include other standard pieces of equipment such as heat exchangers, where necessary, and such are not illustrated herein since they are well known in the industry. The essence of the invention is the method of dehydrating gas which is accomplished by the use of improved separator 12 and improved absorber 14 which will now be described in detail, reference first being had to FIGS. 2, 4, and 5 which illustrate a preferred embodiment of the separator. Gas flows into vessel 12 at inlet 22. Interiorly of the vessel is a cover 62 which causes the gas stream to divert and flow more evenly into the interior of the vessel (See FIG. 5). Within the vessel the gas stream moves upwardly as indicated by the arrows. The increased diameter of the vessel compared to the piping leading to the vessel provides a quiescent zone wherein entrained droplets of liquid can fall out of the moving gas stream by the effect of gravity. Liquid falling out of the entrained gas falls downwardly into the lower portion of the vessel and is collected and maintained at a liquid level 64. The liquid level 64 is detected by a float 66 which operates a control 68 connected to a valve 70 which in turn is connected to the vessel liquid outlet 24. The function of the float 66, control 68, and valve 70 is to maintain the liquid level within a preselected range and to discharge liquid as it accumulates. The details of operation of control 68 and valve 70 are well known in industry and for that purpose are not set forth herein.

Figure 2:
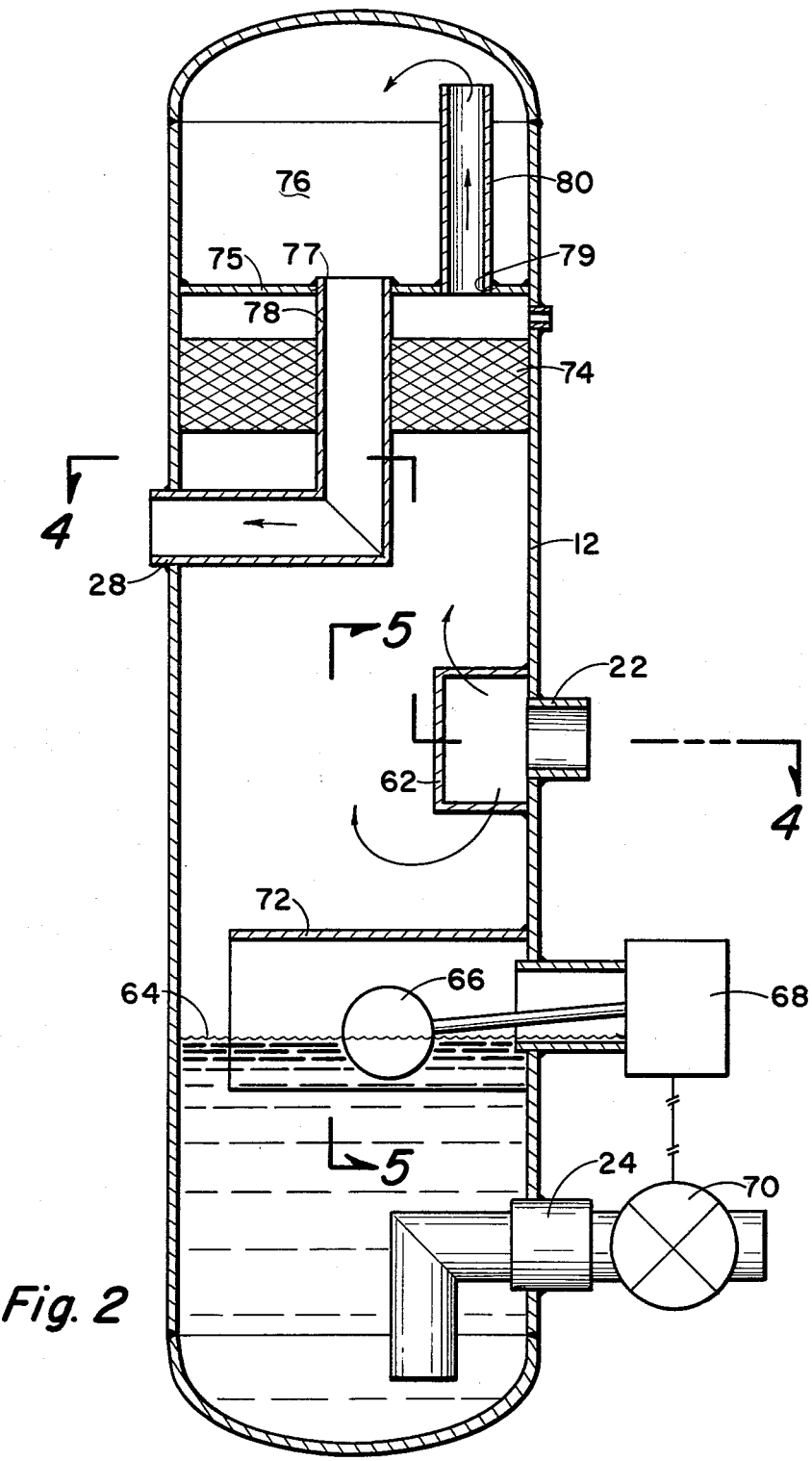
FIG. 2 is a cross-sectional view of the separator vessel as used in the invention.
Figure 5:
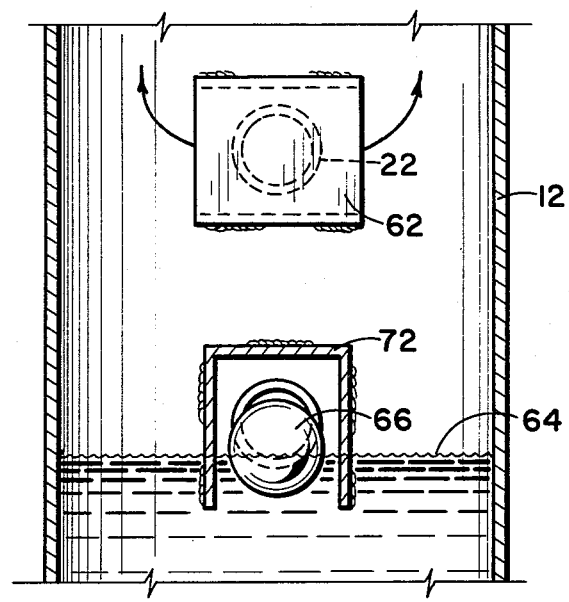
FIG. 5 is a partial vertical cross-sectional view taken along the line 5—5 of FIG. 2 showing some of the details of the internal construction of the separator vessel.

As shown in FIGS. 2 and 5, a cover 72 is provided within the vessel to protect the float 66 from the effect of flowing gas stream and liquid droplets falling downwardly from the stream.

As the gas stream moves upwardly within the vessel, it passes through a mist extractor 74 which is in the form of filter material providing a large amount of surface area. Small liquid droplets accumulate on the mist extractor; and as they form into larger droplets, fall downwardly. The function of the mist extractor 74 is to help increase the gravitational separation of entrained liquid from the gas stream.

A horizontal plate 75 provides within the separator vessel an upper zone 76. Plate 75 has an opening 77 which receives one end of a pipe 78, the other end of the pipe being connected to the gas outlet 28. Another opening 79 in plate 75 receives the lower end of a vertical pipe 80. The upper end of pipe 80 terminates within zone 76. Gas flows upwardly through pipe 80 into zone 76 and thence out of the vessel through pipe 78 and gas outlet 28.

Figure 3:
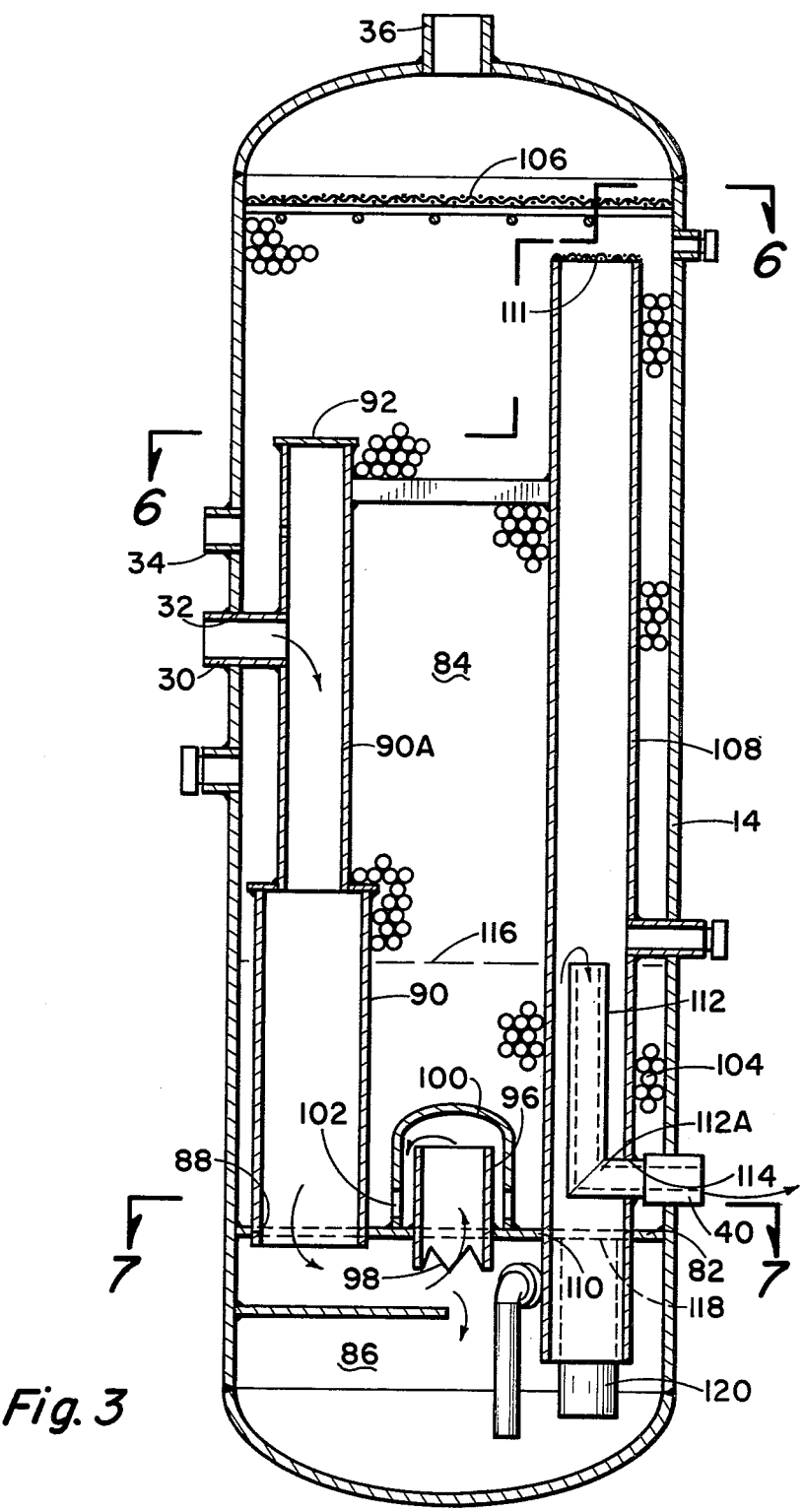
FIG. 3 is a cross-sectional view of one embodiment of the absorber vessel as used in the invention.
Figure 7:
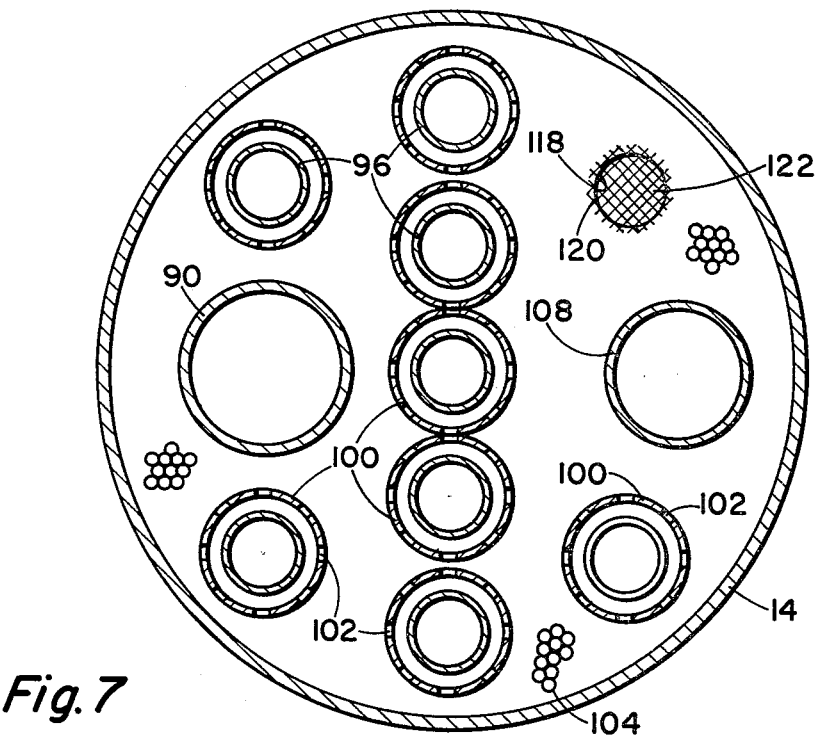
FIG. 7 is another cross-sectional view of an absorber vessel taken along the line 7—7 of FIG. 3 and showing the details of construction of the cylindrical members and caps as employed in the invention.
Figure 6:
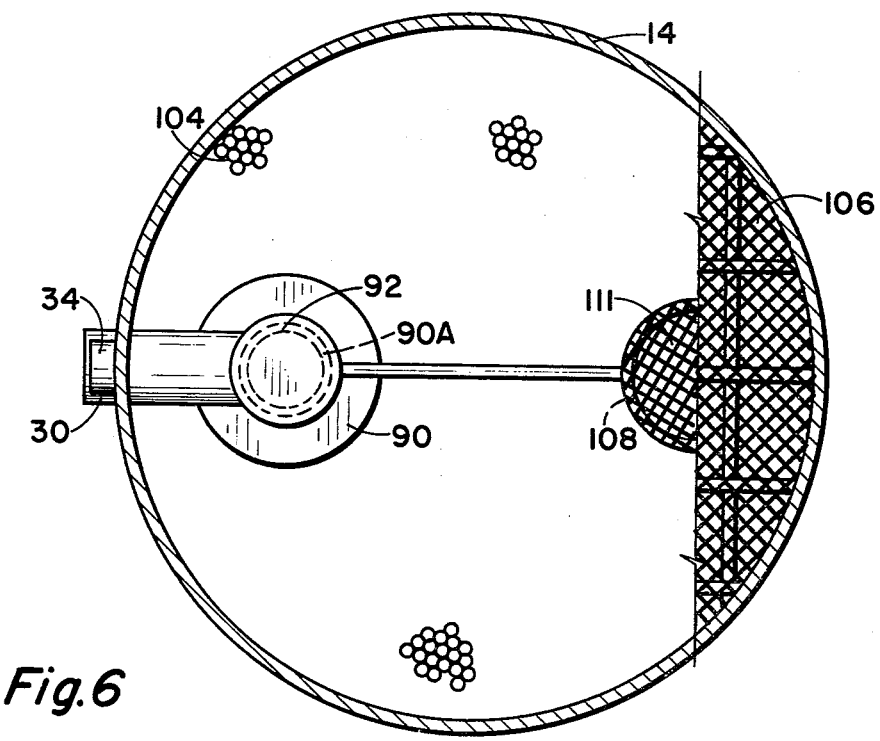
FIG. 6 is a cross-sectional view taken along the line 6—6 of FIG. 3 showing details of the internal construction of one embodiment of the absorber vessel.
Figure 8:
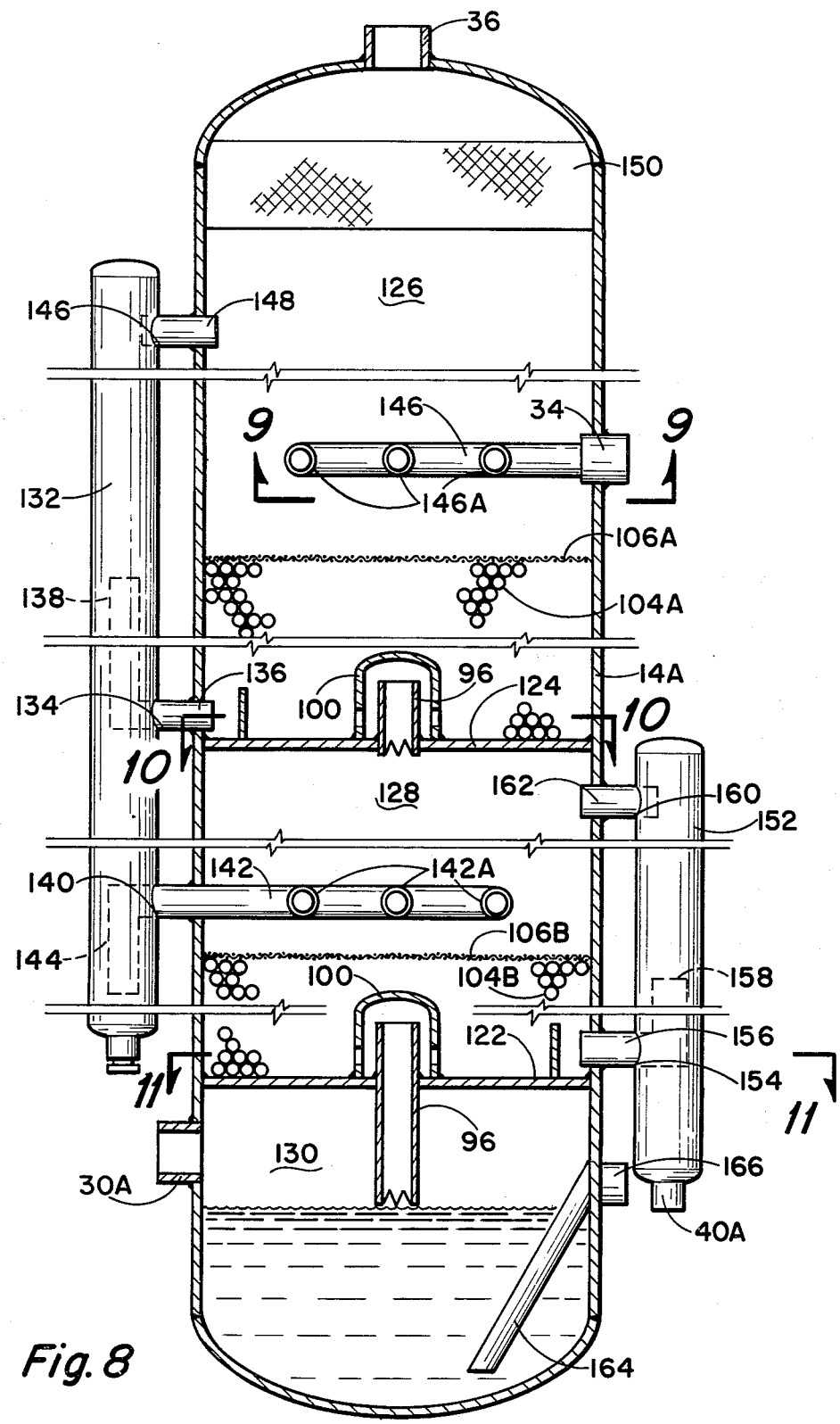
FIG. 8 is a cross-sectional view of another embodiment of the absorber vessel.

Turning now to FIGS. 3, 6, and 7, the details of construction of the absorber will be described. Within the absorber vessel 14 is a horizontal plate 82 which divides the vessel into an upper chamber 84 and a lower chamber 86. The plate 82 has a first opening 88 therein. Vertically received within the interior of the vessel and in opening 82 is a vertical gas conduit 90 having a reduced diameter upper portion 90A which is closed at its top end 92. Pipe 30 passes through the gas inlet 32 and connects with the interior of the gas conduit 90A so that gas flowing into vessel 14 passes downwardly through conduits 90A and 90 and through opening 88 in plate 82 and is discharged in the lower chamber 86.

Plate 82 has a plurality of additional smaller diameter openings (eight being shown in FIG. 7), each of which receives a short length vertical cylindrical member 96. The lower end of each of the cylindrical members 96 extends below the plate 82 and preferably is configured, as shown, wherein the lower edge is defined by a series of notches 98. Welded to the upper surface of plate 82 over each of the cylindrical members 96 is a cap 100. The interior diameter of each of the caps 100 is greater than the exterior diameter of the cylindrical members 96, and the caps have, adjacent their lower edge, a series of passageways 102, the passageways being below the upper ends of the cylindrical members 96.

Filling the lower portion of the vessel upper chamber 84 is a layer of packing 104, the packing surrounding the caps 100. Packing 104 may include pull rings, saddles, ceramic bulls, or any other type of a wide variety of materials commonly employed for such purpose. To retain the thick layer of packing 104 in position, a screen 106 is secured within the interior of the vessel. The function of packing 104 is to provide a large surface area so that gas passing upwardly through the packing thoroughly contacts glycol so that substantially all of the liquid content of the gas is absorbed by the glycol.

A vertical glycol discharge conduit 108 is received in an opening 110 in plate 82. The glycol discharge conduit extends from near the bottom of the vessel within the lower chamber 86 into the vessel upper portion 84 and slightly below screen 106 and is open at each end. A screen 111 covers the upper end of conduit 108. Centrally positioned within the glycol discharge conduit 108 is a glycol outlet conduit 112 which has a horizontal portion 112A extending through an opening 114 in the sidewall of conduit 108. The glycol outlet conduit horizontal portion 112A communicates with the vessel glycol outlet 40. The open upper end of the glycol outlet conduit 112 establishes the height of liquid glycol within the vessel, the level of the glycol being indicated by the numeral 116.

An opening 118 in plate 82 receives a downwardly extending glycol equalization conduit 120, the lower end of which is adjacent the vessel bottom and below the lower end of glycol discharge conduit 108. A screen 122 is placed over the top of the conduit 120 (See FIG. 7) so as to retain packing 104 in position above plate 82.

The method of operation of the absorber vessel 14 will now be described. Gas and glycol flow through pipe 30 into the interior of gas conduit 90A and 90 and downwardly into the vessel lower chamber 86. All of the interior of the vessel 14 below the glycol level 116 is filled with liquid glycol, except where displaced by gas. Gas flowing into the lower chamber 86 passes through notches 98 on the lower end of the plurality of cylindrical members 96. The gas flows upwardly through the cylindrical members and downwardly in the annular area between the exterior of the cylindrical members and the interior of caps 100, and then out through the openings 102 in the caps. Thus the gas thoroughly contacts the pool of glycol in the lower chamber 86. As the gas flows out of outlets 102 in the caps 100, it flows upwardly through the packing 104 in the vessel above the plate 82. The lower portion of the packing below the glycol level 116 is fully immersed in glycol. The portion of packing 104 above the level 116 is not immersed in glycol but is wetted by glycol carried upwardly by the gas stream and by glycol deposited into the packing from glycol inlet 34. The gas stream emerges through screen 106 into the upper portion of the vessel. As the gas moves upwardly, it moves at a relatively low rate permitting any entrained droplets of glycol to fall out of the gas column. A continuous supply of anhydrous glycol flows through inlet 34. Glycol flows downwardly through the packing 104 against the direction of the flow of gas as it moves upwardly through packing 104. The glycol passes downwardly to the lower chamber 86 through conduit 120 and into the interior of glycol discharge conduit 108 and rises upwardly therein into the upper end of the glycol outlet conduit 112 where it flows into the conduit and out through glycol outlet 40.

The combination of the separator 12 and absorber 14 provides an arrangement wherein wet gas is more effectively and efficiently treated for removal of entrained water without requiring the high vertical height of commonly employed dehydrator systems.

Figure 10:
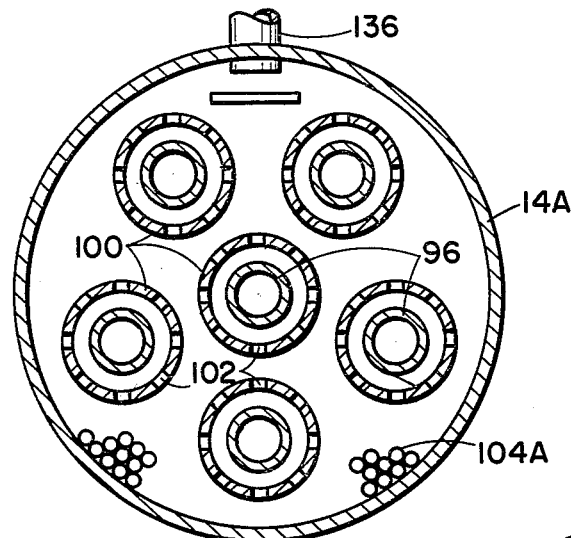
FIGS. 9, 10, and 11 are cross-sectional views taken along the lines 9—9, 10—10, and 11—11 of FIG. 8.
Figure 9:
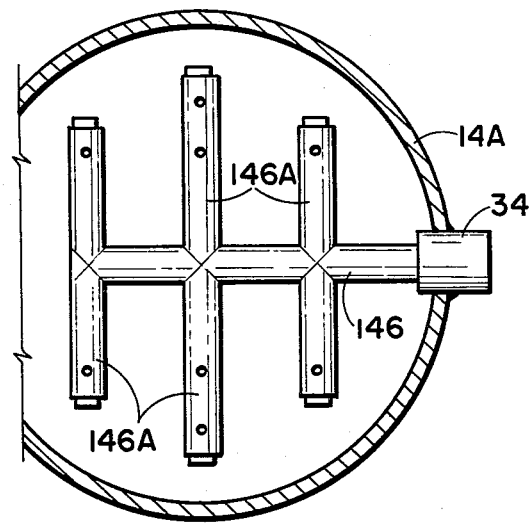
Figure 11:
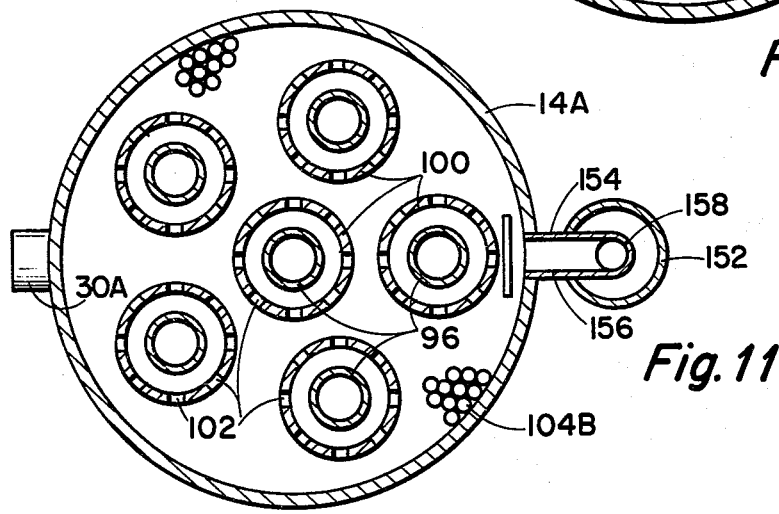

An alternate arrangement of the absorber is illustrated in FIGS. 8 through 11 wherein like numbers refer to like elements described in the previous embodiments. The upright vessel 14A is divided by a lower horizontal partition 122 and an upper horizontal partition 124 into an upper zone 126, an intermediate zone 128, and a lower zone 130. Each horizontal partition 122 and 124 is provided with openings receiving vertical cylindrical members 96, each having notches 98 on the lower ends, there being six such cylindrical members affixed to each of the partitions as illustrated in FIGS. 10 and 12. The length of the cylindrical members 96 extending below horizontal partition 122 is greater than is employed with partition 124.

Welded to the upper surface of partitions 122 and 124 over each of the cylindrical members 96 is a cap 100 having passageways 102, the cylindrical members and caps functioning in the same way as previously described with reference to FIG. 3.

Secured exterior of absorber vessel 14A and adjacent to it is an upright conduit 132, closed at the top and bottom. An opening 134 receives a horizontal pipe 136 which extends within vessel 120 and communicates with the lower portion of upper zone 126. A vertical pipe 138 of diameter less than the internal diameter of conduit 132 is connected at its lower end to horizontal pipe 136. Glycol in zone 126 flows out through pipes 136 and 138 into conduit 132, the height of the upper end of pipe 138 thereby determining the depth of glycol within zone 126.

Another opening 140 in the glycol distribution conduit 132 receives a horizontal pipe 142 which extends within intermediate zone 128. A downwardly extending pipe 144 within conduit 132 is connected at its upper end to horizontal pipe 142. Glycol flows from within conduit 132 into zone 128 through pipes 144 and 142. To achieve better distribution of the glycol within zone 128, pipe 142 is preferably provided with lateral extensions 142A, and these pipes may be closed at their ends and provided with spaced small diameter openings.

A third opening 146 is provided in conduit 132 adjacent its upper end which receives a third horizontal pipe 148 connecting through the wall of vessel 14A to upper zone 126. Pipe 148 provides means of pressure equalization within conduit 132.

The glycol inlet 34 of vessel 14A is connected to a horizontal distribution pipe 146 having lateral branches 146A. Glycol flows into the absorber through opening 34 and pipe 146 into the upper zone 126, saturating packing 104A. The glycol flows through pipes 136 and 138 into the interior of conduit 132 and out through pipes 144 and 142 into zone 128, saturating packing 104B in zone 128. Gas passes into the absorber through gas inlet 30A into lower zone 130, displacing liquid to a level below the lower end of cylindrical members 96. The gas flows upwardly through cylindrical members 96, out through caps 100 and into zone 128 where it is intimately contacted by glycol as it passes upwardly through packing 104B. The gas then passes through cylindrical member 96 in partition 128 and out through caps 100 and upwardly through packing 104A in zone 126. The gas then migrates to the upper end of zone 126 and passes through mist extractor 150 and out of the absorber through the gas outlet.

Affixed to the exterior of absorber vessel 14A is a second upright or vertical glycol exhaust conduit 152. An opening 154 in the wall of this conduit receives a horizontal pipe 156 which communicates with the lower portion of intermediate zone 128. An upwardly extending pipe 158 within conduit 152 is connected at its lower end to pipe 156. The elevation of the open top of pipe 158 determines the height of glycol within intermediate zone 128.

A second opening 160 in conduit 152 adjacent the upper end thereof receives a horizontal pipe 162 communicating with the upper portion of intermediate zone 128 to provide pressure equalization with conduit 152.

Glycol flows out of the absorber 14A through the glycol outlet 40A, having passed through upper zone 126 and intermediate zone 128 wherein, in each case, it thoroughly contacts gas passing upwardly through the vessel. Screens 106A and 106B serve to retain packing 104A and 104B in position within zones 126 and 128. A siphon tube 164 within the lower portion of zone 130 is connected to a fluid outlet 166 by which fluid may be drained from zone 130 as required.

It can be seen that the arrangement of FIGS. 8 through 11 provides an absorber which is improved in two basic ways. First, it subjects gas flowing therethrough to two separate zones of packing permeated with glycol. Second, the absorber is capable of more economical construction since most of the piping interconnecting zones are achieved externally of the vessel. The partition plates 122 and 124 can be fabricated with elements 96 and 100 in place and then installed within the vessel. The packing 104A and 104B and screens 106A and 106B can then be installed. Most of the other details of construction can then be accomplished externally of the vessel 14A.

It can further be seen that while only two active zones 126 and 128 are illustrated, the number of such zones can be increased to any greater number as required as dictated by engineering requirements.

The invention has been described using glycol as the liquid desiccant for extracting water from gas. It is understood that this is by way of example, and the term "glycol" is intended to encompass any liquid desiccant which may be used in the manner described herein for absorbing water entrained in gas. The methods and apparatus of this invention may be used to extract components other than water from gas using liquid reagents other than glycol.

While the invention has been described with a certain degree of particularity, it is manifest that many changes may be made in the details of construction and the arrangement of components without departing from the spirit and scope of this disclosure. It is understood that the invention is not limited to the exemplified embodiments set forth herein but is to be limited only by the scope of the attached claim or claims, including the full range of equivalency to which each element thereof is entitled.

We claim:

1. An absorber for contacting gas having water therein with a liquid desiccant comprising:
   an upright vessel having a lower and an upper horizontal partition dividing the vessel interior into upper, intermediate, and lower zones, the vessel having a gas inlet in the upper zone and a gas outlet in the upper part of the upper zone, each of the partitions having a plurality of spaced apart openings therein;
   a short length vertical cylindrical member supported in each of said openings in each of said partitions, the lower end of each extending below its partition and the upper end of each extending above its said partition;
   a cap covering the upper portion of each of said cylindrical members, the internal diameter of the caps being greater than the external diameter of said cylindrical members, the caps having passageways therein below the upper ends of said cylindrical members;

packing within said vessel intermediate and upper zones supported on said partitions and of depths greater than the height of said caps;

a desiccant entry in said vessel upper zone above said packing;

a desiccant outlet in the lower portion of said upper zone extending exteriorally of said vessel;

a desiccant inlet in said intermediate zone above said packing;

means communicating said desiccant outlet with said intermediate zone desiccant inlet; and a liquid outlet in the lower portion of said intermediate zone.

2. An absorber according to claim 1 wherein said means of communicating said desiccant from said desiccant outlet to said intermediate zone desiccant inlet comprises:

an upright conduit closed at the top and bottom supported adjacent said vessel;

a horizontal pipe connected to said vessel upper portion desiccant outlet and extending through an opening in the sidewall of said upright conduit;

a vertical pipe portion of diameter less than the internal diameter of said upright conduit, the lower end of the vertical pipe being connected to the end of said horizontal pipe within said conduit, the elevation of the upper end of the vertical pipe determining the level of liquid desiccant within said vessel upper zone;

a second horizontal pipe communicating between an opening in said vessel intermediate portion and an opening in said upright conduit.

3. An absorber according to claim 2 including a downwardly extending vertical pipe within said upright conduit of a diameter less than said upright conduit, the upper end being connected to said second horizontal pipe.

4. An absorber according to claim 2 including horizontal distribution pipe connected to and extending from said second horizontal pipe within said vessel for distributing liquid desiccant within said intermediate zone.

5. An absorber according to claim 1 including a vertical discharge conduit supported exterior of and adjacent said vessel having an opening in the sidewall thereof and being closed at the top and having an opening in the lower end thereof;

a horizontal pipe connected at one end to said vessel liquid outlet opening, the pipe extending sealably through said conduit sidewall opening; and a vertical pipe within said vertical discharge conduit of diameter less than said discharge conduit, the lower end thereof being connected to said end of said horizontal pipe within said vertical discharge conduit, the elevation of the upper end of said vertical pipe determining the elevation of liquid desiccant in said vessel intermediate zone.

* * * * *